United States Patent [19]

Sanders et al.

[11] Patent Number: 5,018,857
[45] Date of Patent: May 28, 1991

[54] PASSIVE RING RESONATOR GYRO WITH POLARIZATION ROTATING RING PATH

[75] Inventors: Glen A. Sanders, Plymouth; Robert B. Smith, St. Anthony; Gordon F. Rouse, Arden Hills, all of Minn.

[73] Assignee: Honeywell Inc., Minneapolis, Minn.

[21] Appl. No.: 244,983

[22] Filed: Sep. 15, 1988

[51] Int. Cl.$^5$ .......................... G01B 9/02; G01C 19/64
[52] U.S. Cl. ...................................... 356/350; 356/351
[58] Field of Search ................................ 356/350, 351

[56] References Cited

U.S. PATENT DOCUMENTS

| | | | |
|---|---|---|---|
| 4,110,045 | 8/1978 | Smith, Jr. et al. | 356/350 |
| 4,135,822 | 1/1979 | Ezekiel | 356/350 |
| 4,274,742 | 6/1981 | Lustig | 356/350 |
| 4,326,803 | 4/1982 | Lawrence | 356/350 |
| 4,352,562 | 10/1982 | Minden | 356/350 |
| 4,514,088 | 4/1985 | Coccoli | 356/350 |
| 4,530,097 | 7/1985 | Stokes et al. | 356/350 X |
| 4,569,593 | 2/1986 | Auch et al. | 356/350 |
| 4,673,293 | 6/1987 | Sanders | 356/350 |

FOREIGN PATENT DOCUMENTS 59-50313  3/1984  Japan .................................. 356/350

OTHER PUBLICATIONS

"Eigenstates of Polarization in Lasers", by H. de Lang, Philips Research Reports, vol. 19, pp. 429–440, 1964.
"Eigenstate of Polarization in a Fiber Ring Resonator and its Effect in an Optical Passive Ring-Resonator Gyro", by Iwatsuki et al., Applied Optics, vol. 25, No. 15, Aug. 1986, pp. 2606–2612.
"Matrix Method for the Calculation of the Polarization Eigenstates of Anisotropic Optical Resonators", by Molchanov et al., Soviet Journal of Quantum Electronics, vol. 1, No. 4, Jan.–Feb. 1972, pp. 315–329.
"Development of Low- and High-Birefringence Optical Fibers", by Payne et al., IEEE Journal of Quantum Electronics, vol. QE-18, No. 4, Apr. 1982, pp. 477–488.
"Polarization in Optical Fibers", by Ivan P. Kaminow, IEEE Journal of Quantum Electronics, vol. QE-17, No. 1, Jan. 1981.
"High-Birefringence Fiber-Optic Polarimeter with Submicroradian Phase Delay Detectability", by M. D. Mermelstein, Journal of Lightwave Technology, vol. LT-4, Apr. 1986, pp. 449–453.
"Evaluation of Polarization Maintaining Fiber Resonator for Rotation Sensing Applications", by G. A. Sanders et al., Proc. of Opt. Fiber Sensors Conf., pp. 408–411, New Orleans, 1988, 409–412.
"Polarization Optics of Twisted Single-Mode Fibers", by Ulrich et al., Applied Optics, vol. 18, No. 13, Jul. 1979, 2241–2251.
"Single-Mode Fiber-Optical Polarization Rotator", by Ulrich et al., Applied Optics, vol. 18, No. 11, Jun. 1979, pp. 1857–1861.
"Fiber In-Line Polarization Rotator and Mode Interchanger", by Marrone et al., Applied Optics, vol. 26, No. 16, pp. 3194–3195, Aug. 1987.
"Polarization Properties of Optical Resonators Passive and Active", by H. de Lang, Philips Research Reports Suppl., No. 8, pp. 1–76, 1967.
"Anisotropic Optical Traveling-Wave Resonator", by V. I. Chernen'kii, Translated from Kvantovaya Elektronika, vol. 1, No. 5, pp. 53–59, 1971, Original article submitted Nov. 10, 1970.
"New Rotating-Field Resonator for Lasers", by Danileiko et al., Sovient Journal of Quantum Electronics, vol. 4, No. 3, Sep. 1974, pp. 389–390.
"Polarization Splitting of Opposing Waves in the Ring Laser", by Vasil'ev et al., Translated from Zhurnal Prikladnoi Spektroskopii, vol. 10, No. 6, pp. 920–923, Jun. 1969.

(List continued on next page.)

*Primary Examiner*—Vincent P. McGraw
*Attorney, Agent, or Firm*—Robert A. Pajak

[57] ABSTRACT

A passive ring resonator gyro is constructed of an electromagnetic waveguide ring path which causes a specified rotation of the polarization of the waves, once for each round trip through the ring path. For an optical fiber ring path, a splice at some point is introduced in the ring path in which the fiber ends are rotated relative to each other in order to effect polarization rotation.

21 Claims, 5 Drawing Sheets

OTHER PUBLICATIONS

"Fiber-Optic Rotation Sensing with Low Drift", by Ulrich, Optics Letters, vol. 5, No. 5, May 1980, pp. 173–175.

"Fiber-Ring Interferometer: Polarization Analysis", by Ulrich et al., Optics Letters, vol. 4, No. 5, May 1979, pp. 152–154.

"Passive Ring Resonator Method for Sensitive Inertial Rotation Measurements in Geophysics and Relativity", by Sanders et al., Optics Letters, vol. 6, No. 11, Nov. 1981, pp. 569–571.

"Unstable Resonators with 90° Beam Rotation", by Paxton et al., Applied Optics, vol. 25, No. 17, Sep. 1986, pp. 2939–2946.

"Applications of Fibre Optic Ring Resonators Using Laser Diodes", by Tai et al., Optica Acta., vol. 33, No. 12, pp. 1539–1551, 1986.

"Fiber-Optic Passive Ring-Resonator Gyroscope Using an External-Cavity Laser Diode", by Takahashi et al., Optics Letters, vol. 13, No. 3, Mar. 1988, pp. 236–238.

"Effect of Reflections on the Drift Characteristics of a Fiber-Optic Passive Ring-Resonator Gyro", by Takahashi et al., Optics Letters, vol. 13, No. 5, May 1988, pp. 413–415.

Coreference: "Fiber and Laser Sensors", by G. Sanders et al., SPIE Proceeding, 6–7, Sep. 1988.

PASSIVE RING RESONATOR GYRO WITH POLARIZATION ROTATING RING PATH

BACKGROUND OF THE INVENTION

The present invention relates to gyroscopes utilizing a pair electromagnetic waves injected into a closed-ring resonant path, in opposite directions, in order to sense inertial rotation. The waves are caused to propagate around the ring path by means of some form of electromagnetic waveguide. More particularly, the invention relates to passive ring resonator gyros wherein the difference between resonant frequencies of two counter-propagating electromagnetic waves, introduced into the passive ring resonator path from a source of energy external to the ring path, is linearly proportional to the rotation rate.

The well known Sagnac Effect quantitatively describes the existence of a difference in the relative phase of two electromagnetic waves after traveling in opposite directions around a closed ring path. In gyro applications of the Sagnac Effect, the difference in phase is directly proportional to the inertial rotation rate about an axis normal to the plane of the ring path. Because the ring path is closed, the waves may propagate in multiple round trips around the ring. The waveguide ring structure is resonant at certain optical frequencies. Because of the Sagnac phase difference, the resonant frequencies are different for the waves propagating in the opposite directions in the presence of inertial rotation due to differences in the effective closed-loop path length traveled by the two counter-propagating waves. This frequency difference is directly proportional to the inertial rotation rate which may be measured by measuring the difference in the resonant frequencies of the counter-propagating waves. The frequency difference and sensitivity of the gyro to rotation is further a function of the area circumscribed by the closed ring waveguide path, the perimeter of the waveguide path, the effective refractive index of the waveguide an material within the waveguide, and the free-space wavelength of the waves.

In the prior art of passive ring resonator gyros, operation has been generally restricted to utilizing a single-polarization wave in each direction and nearly always the same polarization in both directions. In general, electromagnetic waveguides are capable of supporting propagating waves of two possible polarizations, the most common of which are linearly polarized horizontal and vertical waves, but in some systems may be a pair of elliptically polarized waves or even right and left circularly polarized waves.

Similarly, in a ring resonator composed of such electromagnetic waveguide material, two polarization states exist in each direction around the ring. These states, each of which have resonances associated with them, are commonly referred to as resonant polarization eigenstates. Polarization eigenstates are essentially states of polarization that at any point around the ring do not change their state of polarization after one or more round trips around the ring. Eigenstates of polarization are described in detail in a publication entitled, "Eigenstates of Polarization in Lasers" by H. de Lang, Philips Research Repts, Vol. 19, pp. 429-440, 1964; and a publication entitled, "Marix Method for the Calculation of the Polarization Eigenstates of Anisotropic Optical Resonators", by V. Ya. Molchanov and G. V. Skrotskii, Soviet Journal of Quantum Electronics, Vol. 1, No. 4, pp. 315-330, January-February, 1972. Further, Eigenstates of polarization in a passive ring resonator gyros are discussed in a publication entitled, "Eigenstates of Polarization in a Fiber Ring Resonator and its Effect in an Optical Passive Ring-resonator Gyro", by K. Iwatsuki, K. Hotate, and M. Higashiguchi, Appl. Opt. 25, 15, 2606-12 (1986). These references are incorporated herein by reference.

Eigenstates of polarization can be simple, such as nearly horizontal and vertical linear polarized waves, elliptical polarized waves, or can exhibit complex behavior in which the polarization varies from point to point along the resonator.

Ring resonators of the prior art are often those having very nearly horizontal and vertical linear polarization eigenstates. In ring resonator gyros of the prior art, the possible excitation of both polarizations and the possible nearly identical resonant frequencies for the two different polarizations can prevent gyro operation or compromise its performance. To alleviate this problem, one of the two polarized waves in each direction is usually suppressed by some means or by providing special means so that the external source does not excite the other unwanted polarization. Prior art schemes for obviating the problem of unwanted polarized waves rely on, among others, careful polarization control of the light waves, tight component tolerances, and/or the introduction of high propagation losses for one of the two polarization eigenstates. These schemes are generally costly to implement, complex, and/or may introduce other error sources.

BRIEF DESCRIPTION OF THE INVENTION

It is an object of the present invention o minimize the need to suppress waves of one polarization in order to make a gyroscope.

In the present invention, a passive ring resonator gyro is constructed of an electromagnetic waveguide ring path which causes a specified rotation of the polarization of the waves, once for each round trip around the ring path. The polarization rotation of the waves is about the centerline axis of propagation of the waveguide. The polarization rotation in accordance with the present invention may be introduced at any of several possible positions around the ring path, and may be effected in different ways. One embodiment of the invention, as an example, but to which the invention is not limited, is to introduce a splice at some point in the ring path on either side of which the linearly birefringent waveguide (comprising the ring) is rotated with respect to the waveguide on the other side of the splice. The amount of polarization rotation is arbitrary, although specific values such as 30, 45, or 90 degrees may be more advantageous.

BRIEF DESCRIPTION OF THE DRAWINGS

FIG. 4b illustrates the ideal frequency response of the ring resonator of FIG. 4a.

FIG. 6 illustrates an alternate embodiment of the invention illustrated in FIG. 4a.

FIG. 7b illustrates one mechanism for achieving 90 degree polarization rotation with a birefringent optical fiber coupler in the spliceless ring resonator design of FIG. 7a.

DETAILED DESCRIPTION OF THE INVENTION

Figure 1:
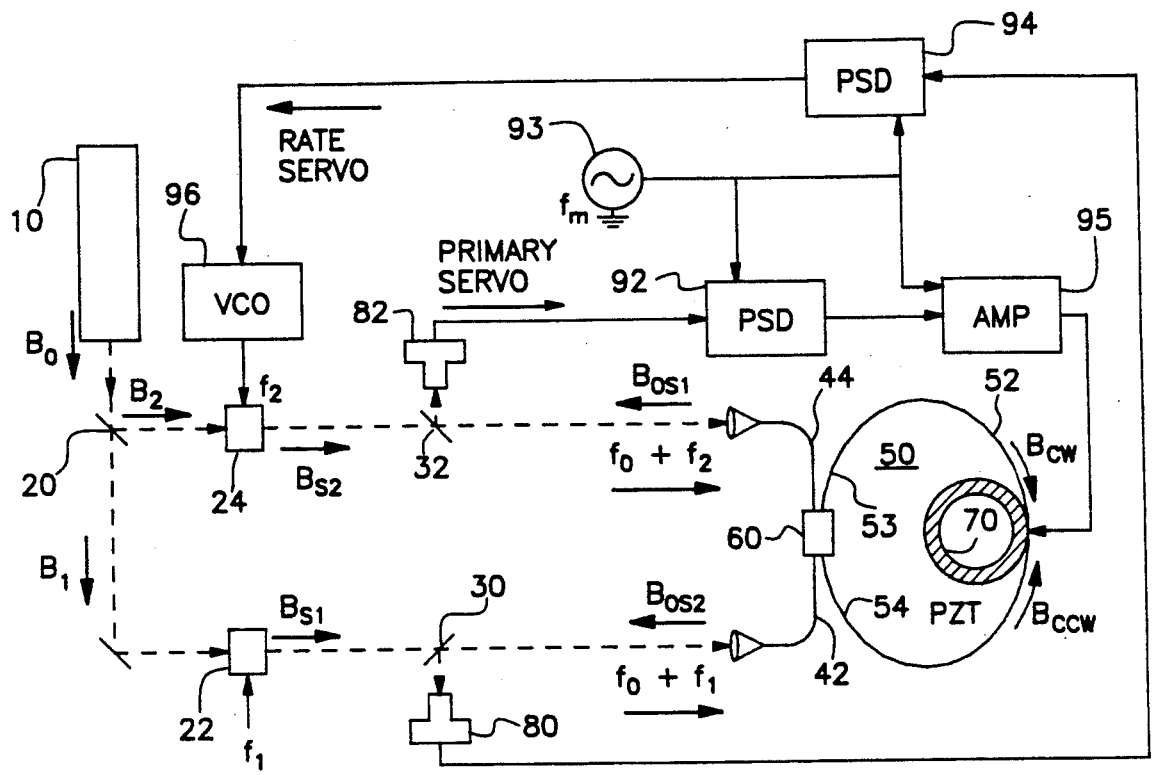
FIG. 1 is a schematic block diagram of a prior art fiber-optic ring resonator gyro.

Herein, the term ring resonator refers to any closed-ring or closed-loop electromagnetic waveguide structure which encloses an area, and in which an electromagnetic wave, injected therein, can make one or more round trips about or along or through the waveguide structure in either of two directions around the ring. Such waveguides include, among others, integrated optics, bulk optics including mirrors, optical fibers, metal microwave waveguides and the like. Further, hereafter the term wave will refer to any electromagnetic wave including, among others, microwaves, optical light waves, visible or non-visible, like those generated from a laser beam source. Generally, the electromagnetic waves referred to herein are coherent waves.

Further, in the discussion which follows, the terms beam and wave are intended to be interchangeable. Beams are generally used to discuss direction and paths of light which the electromagnetic waves follow, and waves are particularly suited to discussions relevant to wavelength, frequency, polarization states, interference, and the like.

Passive ring resonator optical gyros utilizing laser beams as a source of electromagnetic waves are well known in the art, and are particularly described in U.S. Pat. No. 4,135,822, issued to Ezekiel.

The conventional passive resonant ring laser gyro includes a ring resonator for the propagation of two counter-propagating optical waves. The ring resonator is generally made up of a plurality of reflecting surfaces or mirrors, or alternatively an optical fiber, and in which there is no active gain medium in the closed ring path provided by the ring resonator. The two counter-propagating optical waves are established by one or two laser light-generating sources external to the ring resonator. The two optical waves are generally coupled into the ring resonator through partially-transmitting mirrors, or alternatively fiber-optic couplers Independent servo loops may be used to vary either the frequency of each of the two optical waves, or alternatively the length of the ring path and the frequency of one of the two optical waves, to establish the waves to be at resonance in both directions within the ring resonator.

In some passive ring resonator gyros of the prior art, a single laser source is used to generate a pair of laser beams which are coupled into the ring resonator in first and second opposite directions. In some embodiments of the prior art, one servo loop modulates the ring resonator optical length to cause the resonant frequency of the ring resonator for waves propagating in the first direction to be the same as the frequency of the optical wave coupled into the ring resonator in the first direction. The other laser beam is frequency shifted to cause the optical wave coupled into the ring resonator in the second direction to be at the resonant frequency of the ring resonator for waves propagating in the second direction. In general, two servo control loops are needed for matching the frequencies of the two injected optical waves to the resonant frequencies of the ring resonator in the presence of rotation.

A ring path constructed of an optical fiber is particularly applicable to passive ring resonator gyros. This is so since an optical fiber can provide a ring resonator comprised of a coil of an optical fiber having many turns thereon. The resulting ring resonator has a sensitivity which is proportional to the number of coil turns or loops times the area circumscribed by one fiber loop.

Commonly, passive ring resonator fiber-optic gyros include a laser beam source for generating and launching a light wave of a single linear polarization. In turn, the launched light wave is split and coupled into a ring resonator to produce two light waves counter-propagating along the ring resonator waveguide. The ring resonator is provided, at least in part, by an optical-fiber which is a polarization maintaining fiber—that is, the optical fiber is highly birefringent. Thus, the system as just described is such that the counter-propagating waves in the ring are each intended to be a single linear polarization light wave.

In fiber-optic passive ring resonator gyros, an obstacle to realizing practical and useful gyro performance parameters is believed to stem from the excitation of two polarized light waves in each direction of the ring path, rather than just one of the two possible polarizations as intended. This is usually true even though the electromagnetic wave was launched having a single linear polarization state. The ring resonator supports the simultaneous and independent propagation of four different resonant light waves—one wave for each of the two polarizations in each of the two directions.

To understand the behavior of the ring resonator, it is useful to first consider only two polarized resonant waves in one direction. Except for special circumstances, these two resonant light waves in one direction around the ring will be nominally polarized along the X and Y axes of the birefringent fiber. The resonant ring will therefore have different resonant frequencies for the two possible polarized waves in each direction since light travels at different speeds along the X and Y axes of the birefringent fiber. (By definition, the index of refraction is different along the X and Y polarization axes of a birefringent fiber.)

Since the path length of the fiber ring determines the resonant frequency for each polarized light wave in each direction, any change in path length due to environmental conditions, particularly temperature, will grossly affect the performance parameters of the gyro. Commonly in passive ring resonator gyros, photodetectors are utilized to detect the amplitude of the waves propagating along the ring resonator path. The outputs of the detectors become the control inputs to the aforementioned servo loops. Therefore the light detectors will in practice be at least partially responsive to both linearly polarized light waves. In turn, the gyro servo loops which maintain the counter-propagating light waves at resonance within the ring resonator are also affected by the detection of light of both polarizations. This unintended excitation and detection of the secondary and unwanted polarized light wave is believed to cause one of the largest errors in fiber-optic ring resonator gyros.

FIG. 1 illustrates a simplified schematic diagram of a passive ring resonator optical fiber gyro known in the art. Source 10 provides a laser beam identified as $B_0$ which is split by beam splitter 20 into beams $B_1$ and $B_2$. Beam $B_1$ is passed through a frequency shifter 22 and emerges as beam $B_{S1}$. A portion of beam $B_{S1}$ passes through beam splitter 30 and is injected or launched into fiber 42. In a similar fashion beam $B_2$ passes through frequency shifter 24 and emerges as beam $B_{S2}$. Beam $B_{S2}$ passes through beam splitter 32 before being launched into optical fiber 44. It should be noted that beam splitters 30 and 32 are only utilized for redirecting return energy coupled out of the ring toward other gyro system components. The intended function of the beam splitters may be accomplished by other techniques, such as, for example, fiber optic couplers.

Ring resonator 50 includes an optical fiber 52 which has first and second segments 53 and 54 which are coupled to directional optical-coupler 60. Commonly in the prior art, ring resonator 60 is comprised of a continuous optical fiber with a single splice, and a portion of the fiber 52 passing through optical coupler 60. A portion of optical fiber 52 is illustrated being wound around cylindrically shaped piezoelectric (PZT) device 70 in order to effect a change in the total optical fiber length in a well known manner. Optical fibers 42 and 44 are also shown coupled to coupler 60.

It should be understood by those skilled in the art that coupler 60 may be provided by a wide variety of bulk optic, fiber-optic, and integrated optic techniques to provide the intended function of coupling input waves into the ring and/or coupling out of the ring portions of the waves traveling along the ring path. In one practical implementation of coupler 60, fibers 42 and 44 are portions of a single continuous fiber, and fibers 53 and 54 are also portions of the continuous fiber ring 50. In this situation, the fiber ring 50 contains a splice, not shown, somewhere appropriately along the ring resonator path in a well known manner.

For passive ring resonator structures, the amount of energy coupled into the ring resonator through a coupler is dependent upon the difference between the frequency of the input wave coupled into the ring resonator and the resonant frequency of some ring resonator mode.

In FIG. 1, coupler 60 functions to couple a portion of beams $B_{S1}$ and $B_{S2}$ into fiber 52 resulting in clockwise beam $B_{cw}$ and counter-clockwise beam $B_{ccw}$, respectively, counter-propagating in ring resonator 50. The magnitude of energy of beam $B_{cw}$ is dependent upon the difference between the frequency of input beam $B_{S1}$ coupled into ring resonator 50 and one of the resonant frequencies of the resonator for beams traveling in the clockwise direction. Similarly, the magnitude of energy of beam $B_{ccw}$ is dependent upon the difference between the frequency of input beam $B_{S2}$ coupled into ring resonator 50 and one of the resonant frequencies of the resonator for beams traveling in the counterclockwise direction.

FIG. 1 further includes components for detecting the condition of resonance of the resultant $B_{cw}$ and $B_{ccw}$ beams propagating in the ring resonator. Referring to FIG. 1, one ring resonator output is provided by beam of light $B_{OS1}$ emerging from fiber 44 and is directed toward photodetector 82 after being reflected from beam splitter 32. Similarly, the other ring resonator output is provided by beam of light $B_{OS2}$ emerging from fiber 42 and is directed toward photodetector 80 after being reflected from beam splitter 30.

Output beam $B_{OS2}$ represents the energy of that portion of beam $B_{S2}$ not coupled through coupler 60 into ring resonator 50. Similarly, output beam $B_{OS1}$ represents the energy of that portion of beam $B_{S1}$ not coupled through coupler 60 into ring resonator 50.

The output signal of photodetector 82, representative of beam $B_{OS1}$, is presented to a phase sensitive demodulator 92; the output of phase sensitive demodulator 92 is summed in amplifier 95 with AC modulation source 93 having frequency $f_m$. The output of amplifier 95 is presented to the input of PZT device 70 for modulation of the length of optical fiber 52 in a well known manner. This comprises the primary servo control loop.

The output signal of photodetector 80, representative of beam $B_{OS2}$ is presented to a phase sensitive demodulator 94. The output of phase sensitive demodulator 94 is presented to voltage controlled oscillator (VCO) 96 having an output thereof presented to optical frequency shifter 24. The optical frequency shifters 22 and 24 may be, by example, an acousto-optic frequency modulator. In both phase-sensitive demodulators 92 and 94 the signals are frequency demodulated at reference frequency $f_m$.

The operation of the passive ring resonator fiber-optic gyro illustrated in FIG. 1 will now be described. The laser light $B_0$ at frequency $f_0$ is split equally into two beams $B_1$ and $B_2$, each of which is frequency shifted by different amounts prior to being coupled into ring resonator 50. The resulting resonator clockwise beam $B_{cw}$ has frequency $f_0+f_1$—namely beam $B_1$ of optical frequency $f_0$ shifted by frequency $f_1$ by means of frequency shifter 22. The resulting resonator counterclockwise beam $B_{ccw}$ has frequency $f_0+f_2$—namely beam $B_2$ of optical frequency $f_o$ shifted by frequency $f_2$ by means of frequency shifter 24.

The clockwise beam resonant condition is sensed by photodetector 82 which detects the intensity of light waves impinging thereon. Resonance is indicated by a signal dip in the photodetector 82 output signal. This is so since at resonance most of beam $B_{S1}$ will be coupled into ring resonator 50, and very little will appear as beam $B_{OS1}$ coupled out of the resonator. The resonant frequency of waves traveling in the CW direction in resonator 50 is locked to frequency $f_0+f_1$ by means of a primary servo-loop including photodetector 82, phase sensitive demodulator 92, summing/amplifier circuit 95, modulation source 93, and PZT 70—which adjusts the resonator ring path length via the PZT device 70. In this way, the difference between the resonator clockwise resonance frequency and the frequency of the input beam $B_{S1}$ is removed. To provide a discriminate for sensing departures from resonance, modulation frequency source 93 is employed whereby the resonator length is modulated at frequency $f_m$. The output signal of photodetector 82 is demodulated at frequency $f_m$ by phase sensitive demodulator 92 to provide the primary frequency servo control loop.

Using similar servo control techniques, the average counterclockwise beam frequency is adjusted to match the counterclockwise ring resonant frequency by means of a second servo, sometimes referred to as the "rate servo." The rate servo includes photodetector 80, phase sensitive demodulator 94, voltage controlled oscillator 96 and frequency shifter 24. The output of the phase sensitive demodulator 94 drives voltage controlled oscillator 96 to control the frequency of beam $B_{S2}$, having value $f_0+f_2$ to be the same as the counterclockwise resonant frequency of resonator 50.

In closed-loop operation, the frequency difference $f_1-f_2$ is then a measure of the inertial rotation rate.

In summary, the primary servo adjusts the optical path length of ring resonator 50 such that the clockwise resonance frequency thereof is $f_0+f_1$. This primary servo condition is obtained regardless of the rate of rotation of the ring resonator 50. At the same time, the frequency shift $f_2$ is varied by the rate servo such that frequency $f_0+f_2$ corresponds to the resonant frequency for waves in the counterclockwise direction of the resonator 50 for all rates of rotation of ring resonator 50. Thus, the absolute value of the frequency difference $f_2-f_1$ is related to the rate of rotation of ring resonator 50.

Prior art passive ring resonator fiber gyros designed similar to that shown in FIG. 1 make use of mono-mode optical fibers to provide a mono-mode waveguide for the ring resonator. Herein the use of mono-mode waveguides refers to the single transverse spatial mode of the electromagnetic wave which may propagate along the longitudinal axis of the waveguide —in the direction of the optical fiber length. With each such transverse spatial mode there actually are associated two independent polarization modes, for example horizontal and vertical polarization or right-hand and left-hand circular polarized waves. In the prior art, the intention has commonly been to use only one polarization mode or eigenstate. Any light propagating with other, unintended, polarization is considered detrimental to good gyro performance, i.e., for inertial rotation measurement.

In the description which follows, only the details of resonator 50 including optical fiber 52 and coupler 60, including optical fibers 42 and 44, will be shown. Further, only one of the beams injected into optical fiber 52 will be illustrated.

Specifically, only the input beam $B_{S1}$, the resulting clockwise beam $B_{cw}$, and the detected beam $B_{0S1}$ will be shown and discussed. Beams traveling in the opposite direction will behave in a similar manner.

Figure 2A:
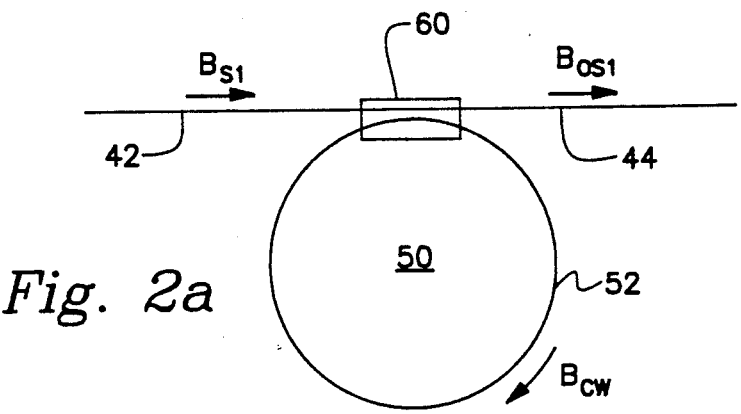
FIG. 2a illustrates the detail of the resonator coupler and the ring resonator of the prior art.

Now referring to FIG. 2a, there shown is the ideal situation in which optical fibers 42, 44 and 52 are mono-mode optical fibers. The injected input beam $B_{S1}$ is coupled into optical fiber ring 50 in the clockwise direction through coupler 60 resulting in the clockwise beam $B_{cw}$. Lastly, there shown is the output beam $B_{0S1}$ from coupler 60, which is directed to photodetector 82 as shown in FIG. 1.

Figure 2B:
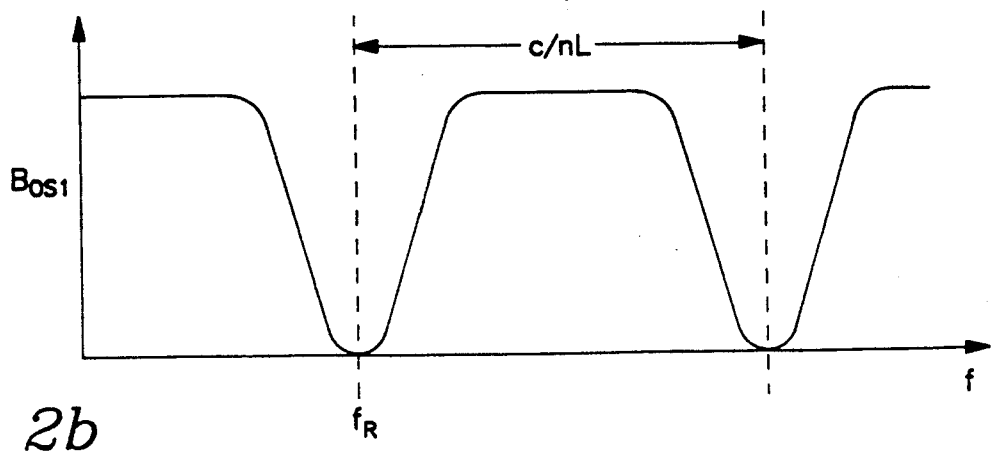
FIG. 2b illustrates the ideal photodetector output vs. input light frequency when a single polarization wave is injected into the ring resonator of FIG. 1.

FIG. 2b illustrates the ideal frequency response of the output signal from photodetector 82 as the optical frequency of beam $B_{S1}$ is varied. The characteristic illustrated in FIG. 2b is for the idealized mono-mode fiber in which the polarization of beam $B_{S1}$, the injected wave into the ring resonator, is perfectly aligned with the polarization eigenstate of the ring resonator. Then, only a single polarization state is excited and propagating in the ring-resonant 50.

However, in practice, the problem is that the alignment of the polarization of the input wave $B_{S1}$ and a polarization eigenstate of the ring is difficult to achieve to the required degree.

The resonant frequency $f_R$ of a beam in ring resonator 50 is mathematically described by:

$$f_R = q(c/nL)$$

The numerical value of "q" is the integral number of wavelengths of light around the path at resonance within ring resonator 50; n is the effective index of refraction of the propagation path; L is the path length of the ring path; and c is the speed of light in vacuum.

The factor "c/nL" in the above equation is termed the free spectral range of the ring resonator. The free spectral range is the frequency difference between two adjacent longitudinal resonant modes of the resonator, i.e., those resonant modes having nearly the same polarization characteristics but differing in optical round trip pathlengths around the ring by one wavelength.

Figure 3A:
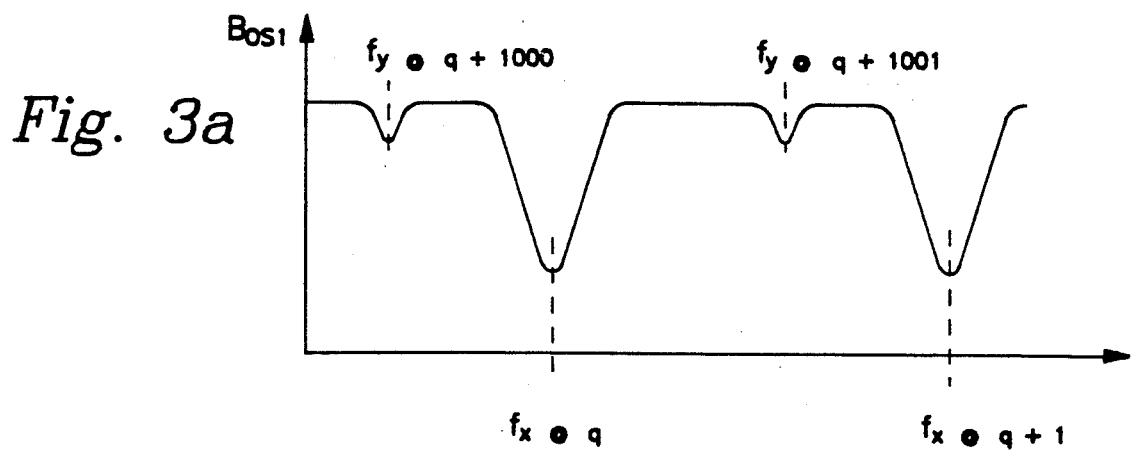
FIG. 3a illustrates the frequency response of the ring resonator of FIG. 2a utilizing a polarization-maintaining fiber when primary and secondary polarized light waves are injected into the ring resonator.

FIG. 3a illustrates the frequency response in a practical situation for the resonator of FIG. 2a when fiber 52 thereof is comprised of a highly linearly birefringent polarization maintaining (PM) fiber. That is, fiber 52 is not only a mono-mode waveguide, but also has X and Y orthogonal axes of linear polarization. Mono-mode birefringent fibers permit the excitation of waves of two linear polarizations with different phase velocities determined by the differing refractive indexes $n_x$ and $n_y$ to propagate along the fiber. This type of fiber is particularly described in a publication entitled "Development of Low- and High-Birefringence optical fibers", by D. N. Payne, A. J. Barlow and J. J. Hansen, IEEE Q.E. Vol. QE-18 No. 4., April 1982, or the publication entitled "Polarization in Optical Fibers", by I. P. Kaminow, IEEE Q.E. Vol. QE-17, No. 1, January 1981. These references are incorporated herein by reference.

In ring resonators 50 using the polarization maintaining fiber, the frequency response as seen at the photodetector 82 is that as shown in FIG. 3a. FIG. 3a illustrates that there exists a different resonant frequency for each of the two linear orthogonally polarized light waves. This is so since the two different indices of refraction of the PM fiber result in different speeds of propagation through the fiber, and different optical pathlengths for each of the two possible polarizations. Therefore, resonant frequencies for the different polarization modes along each of the different axes of the fiber are not equal. This is particularly described in a publication entitled "Evaluation of Polarization Maintaining Fiber Resonator for Rotation Sensing Application", by G. A. Sanders, N. Demma, G. F. Rouse, and R. B. Smith, Proc. of Opt. Fiber Sensors Conf., pp. 408-11, New Orleans, 1988, and is herein incorporated by reference.

Figure 3B:
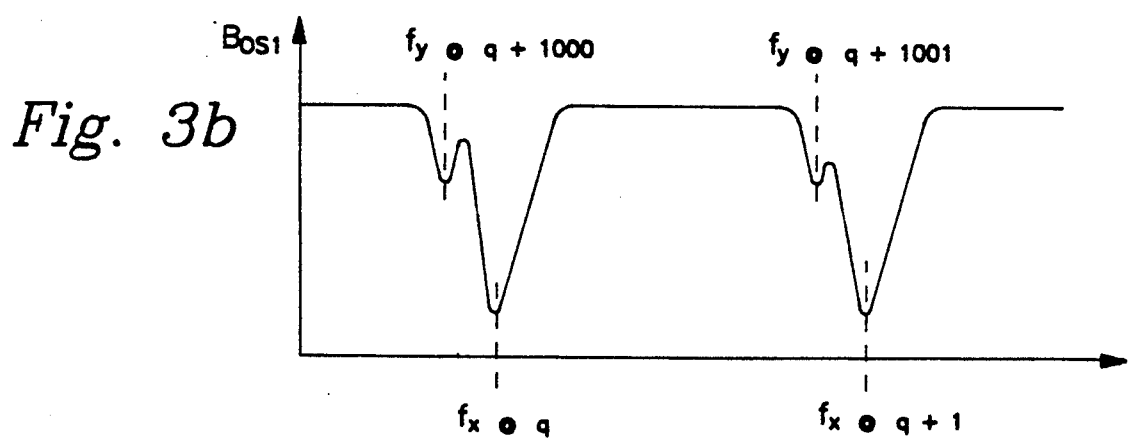
FIGS. 3b-c show the frequency response of FIG. 3a for changes in temperature.

It should be noted that in FIGS. 3a-b, several peaks for each of the polarized waves are shown. This is so since the ring resonator can support an excited wave of an integral number of wavelengths as is well known. The frequency spacing between similar dips (or peaks) is the free spectral range for each of the polarization modes. The "q" number, as before, is simply a convenient way of identifying different resonant waves that can be excited and propagated in the ring resonator. It denotes the integral number of wavelengths that "fit"

inside one round trip (for each polarization) to achieve resonance.

Figure 3C:
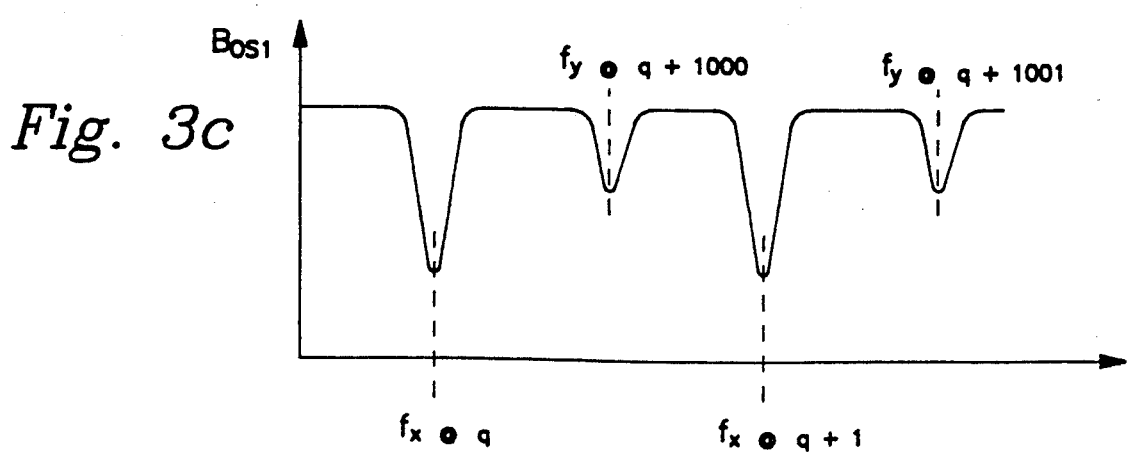

In FIGS. 3a-c, the two possible linear (or nearly linear) polarized waves allowed to propagate in the ring resonator are denoted as X and Y polarized light waves. The X polarized light waves are shown to have resonant frequencies f for different integral number of wavelengths q and q+1, etc. Likewise, Y polarized waves have multiple resonant frequencies $f_y$ at integral wavelength numbers, for example, q+1000 and q+1001, etc. (This is because of the assumption that the Y polarized light waves travel slower than the X polarized light waves and thus the effective pathlength is longer by 1000 wavelengths. Another way of expressing this is that the two polarizations have different free spectral ranges.) In these circumstances, it is important that the servo loops must consistently drive the optical frequency to the center of one of the resonant dips of either the X or Y polarized sets of resonant frequencies.

FIGS. 3a-c illustrate the effect of temperature on the X and Y polarized sets of resonant frequencies. A large optical path length difference exists between the X and Y polarized modes—here 1000 wavelengths in the example—and is sensitive to temperature. The ring path length difference, in fact, drifts about one wavelength per degree centigrade for resonators of roughly one to ten meter length. This means that if the servo loops are intended to track the "X" resonance, then for every degree centigrade temperature change of the ring path the small unwanted resonance mode (Y) drifts through the main resonance of the wanted mode (X). FIG. 3b particularly illustrates the gross distortion of the line shape of the frequency response in response to temperature effects on the fiber resonator. This distortion introduces uncertainties and errors in any measurement of the resonant frequencies of the ring resonator.

Practice of the present invention is intended to eliminate the distortion and errors due to the excitation of the unwanted resonances regardless of excitation of the second polarized wave, by rotating the polarization for each round trip of the waves propagating through the ring resonator.

Figure 4A:
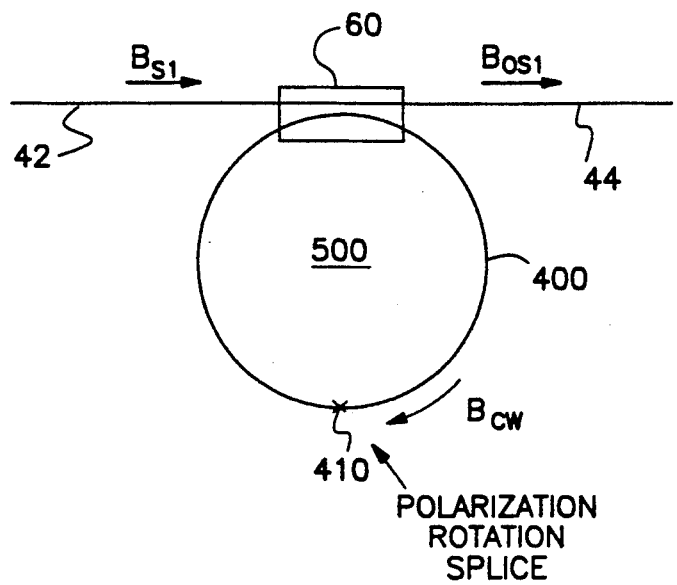
FIG. 4a illustrates a ring resonator in accordance with the present invention.
Figure 5:
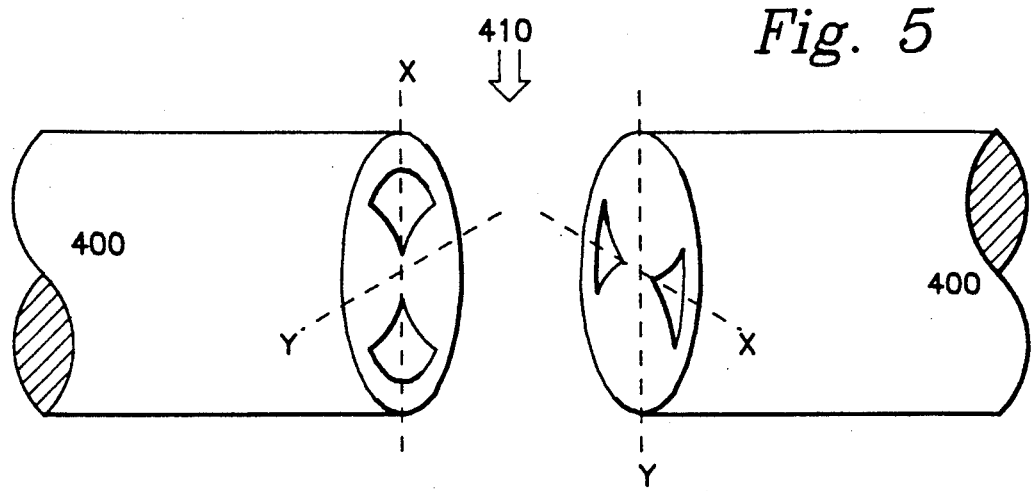
FIG. 5 shows a cross section of one example of an optical fiber splice in a highly-birefringent optical fiber for achieving polarization rotation.

FIG. 4a shows one embodiment of the present invention in which the ring resonator 500 is provided by a highly birefringent mono-mode optical fiber 400, i.e., a PM fiber.. Further, the optical fiber 400 is cut and the two ends are spliced together, 410, with the principal axes of birefringence rotated by a selected angle, shown as 90°, as particularly illustrated in FIG. 5. FIG. 5 illustrates the cross-section of a PM fiber 400 having high birefringence and how the fiber 400 is spliced at juncture or splice 410. Further, FIG. 5 shows the principal axes of birefringence X and Y of fiber 400. In FIG. 5, the principal axes on either side of the splice 410 have been rotated by 90° with respect to each other. The angle 90° is only an example, and other values of rotation angle can give other useful embodiments.

Figure 4B:
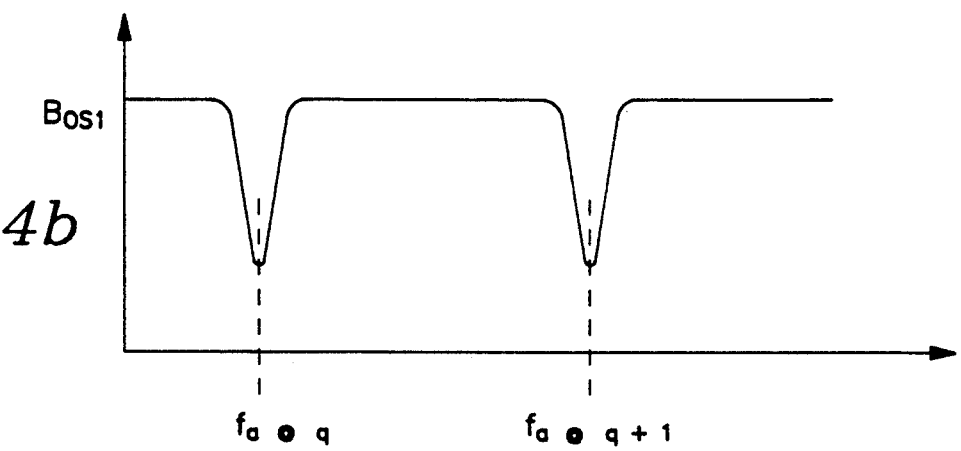

Again referring to FIG. 4a, PM optical fibers 42 and 44 are to couple optical waves into and out of ring resonator 500. In the ideal situation where light is only coupled into one of the resonator polarization eigenstates, only one resonance dip is seen as shown in FIG. 4b. Since the polarization eigenstates for a ring having the rotated axes of birefringence,—herein referred to as polarization rotation angle, are no longer states of linear polarization, the states are now represented as "a" and "b" instead of "X" and "Y". FIG. 4b thus only shows resonance dips and resonance frequencies $f_{a@q}$ corresponding to one polarization state.

Figure 4C:
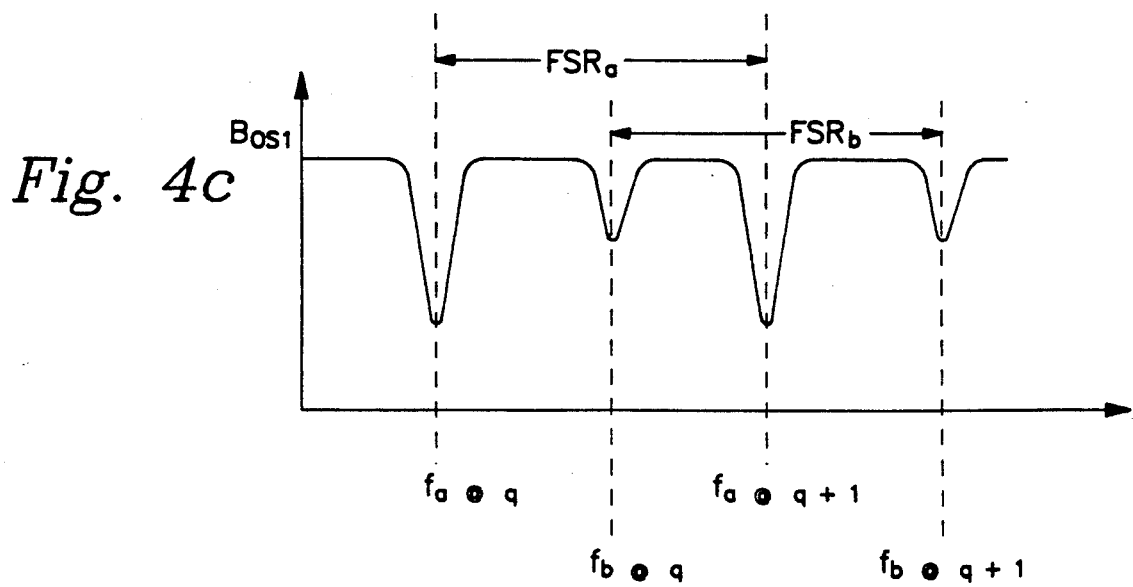
FIG. 4c shows the frequency response of the ring resonator of FIG. 4a for a change in temperature.

FIG. 4c shows the resonator output in practice, that is, when both resonator eigenstates are coupled into (or excited in) the ring resonator, such as for an input wave $B_{S1}$ that is nearly linearly polarized. For FIG. 4c, the polarization rotation angle was chosen substantially close to 90°. In this case, the free spectral ranges "$FSR_a$" and "$FSR_b$" of the two polarization modes are substantially equal. In addition, the resonance frequencies of the two polarization eigenstates $f_a$ and $f_b$ are substantially separated by one half of either free spectral range. In addition, the resonance frequency differences are substantially fixed with temperature; that is, the separation of the resonance frequencies between the two polarization eigenstates remains fixed and the resonances don't cross (as in the case of FIGS. 3a-c). Hence, none of the resonance distortions shown in FIG. 3b and consequent errors occur with the polarization rotation angle near 90°. In effect, the role of the 90° polarization rotation is to create different polarization eigenstates of the ring (not X and Y linearly polarized), each state now being comprised of substantially equal amounts of X and Y electromagnetic field components. These eigenstates can be shown to be circularly polarized or ±45° polarized, or have other elliptical polarization depending on the relative phase of the equal X and Y components. Thus the waves of both eigenstates "see" effectively the same index of refraction, namely an average of $n_x$ and $n_y$ of the fiber. As a consequence of this it can be shown that the pathlengths for the resonant eigenstates are within a half wavelength of each other, instead of 1000 wavelengths as denoted in FIGS. 3a-c. In addition, other splice angles are also of interest, since resonance frequency separations can be achieved between the two resonant polarization eigenstates that also prevent the resonance frequency crossings shown in FIGS. 3a-c.

Figure 6:
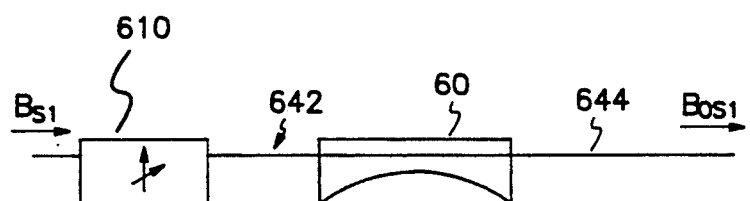
Figure 6:
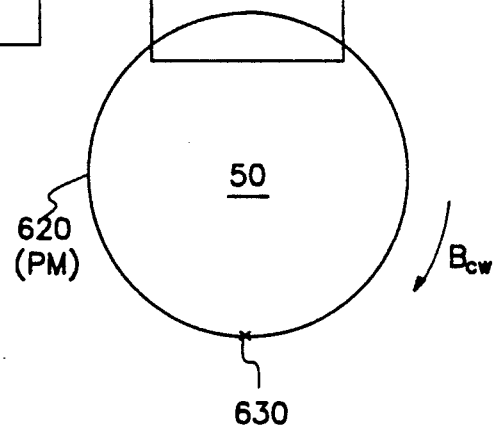

FIG. 6 shows another embodiment of the invention incorporating the principles of the invention illustrated in FIG. 4a and FIG. 5. FIG. 6 is substantially FIG. 4a except highly birefringent fibers 42 and 44 are replaced by a simple mono-mode waveguide, non-polarization maintaining fibers 642 and 644. However, the input wave $B_{S1}$ is first passed through a polarization adjuster 610 before being coupled into the PM fiber 620 including the polarization axes rotation splice 630 like splice 410 of FIG. 4a. The polarization adjuster 610 allows for better coupling of the polarization of the input light into only one resonant polarization eigen mode of the ring resonator. This architecture is most stable with a splice location substantially at the mid point of the ring resonator.

Figure 7A:
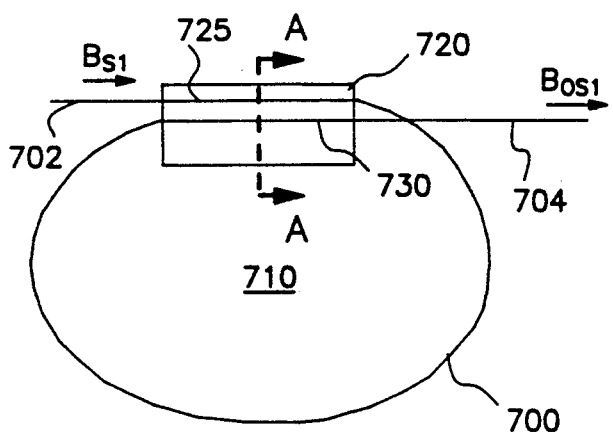
FIG. 7a illustrates a spliceless ring resonator embodiment in accordance with the present invention.
Figure 7B:
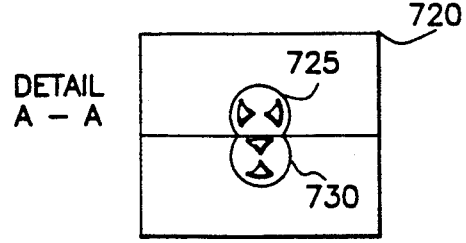

FIGS. 7a-b illustrate another embodiment of the invention utilizing the principles of altering the state of polarization of electromagnetic waves traveling through the ring resonator by rotation thereof at least once within the ring resonator path. In this case, light is cross-coupled between the birefringent axes of two fibers composing the optical coupler 720. This is accomplished by rotation of the principal birefringent axis of the fibers in the coupler as shown in FIG. 7b. The resultant effect is an effective rotation of the polarization within the coupler rather than by using a splice elsewhere in the ring. FIG. 7a particularly illustrates use of a spliceless fiber ring resonator as particularly described and shown in U.S. Pat. No. 4,530,097 entitled Brillouin Ring Laser, issued to Loren F. Stokes et al, and is herein incorporated by reference.

FIGS. 7a–b show how a single continuous strand of fiber can be employed to form both an optical coupler 720 to serve the same function as coupler 60 in FIG. 4a, and at the same time provide a resonant ring path 710 without an "closing splice." Optical fiber 700 forms a loop between first and second end segments 702 and 704. The optical coupler 720 optically closes the loop to form the resonant ring 710.

FIG. 7b illustrates a detailed cross section of the optical coupler 720 in accordance with the present invention. Optical fiber 700 is a highly birefringent polarization maintaining fiber. The optical coupler 720 is constructed so that the input fiber portion 725 is coupled to the output fiber portion 730 such that the axes of birefringence are rotated relative to one another so as to rotate the direction of the linear polarized electromagnetic waves for each passage through the ring resonant ring 710. In essence, the spliceless fiber resonator 710 with coupling means 720 as illustrated in FIG. 7a performs in substantially the same manner as the structure illustrated in FIG. 4a wherein the polarization rotation is provided at splice 410 in the fiber ring 500.

Figure 8A:
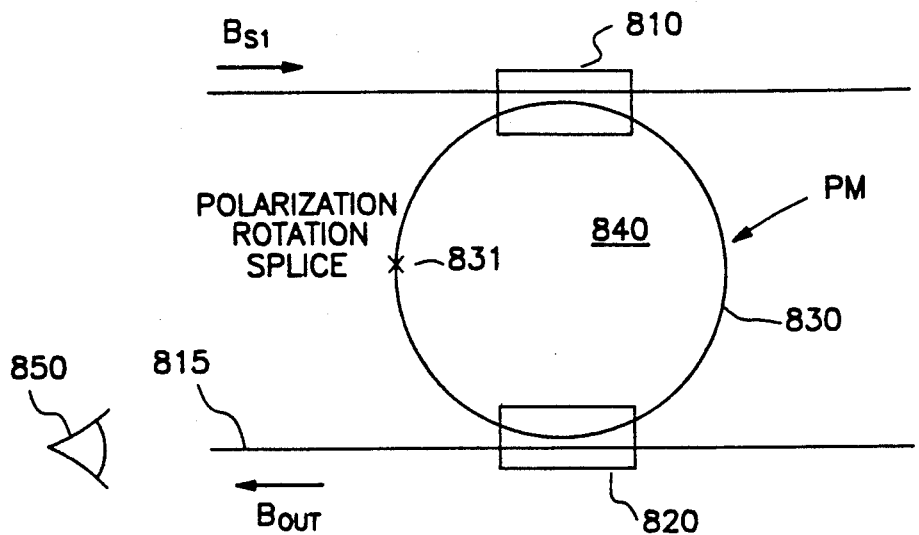
FIGS. 8a-c illustrate further alternate embodiments of the present invention.
Figure 8B:
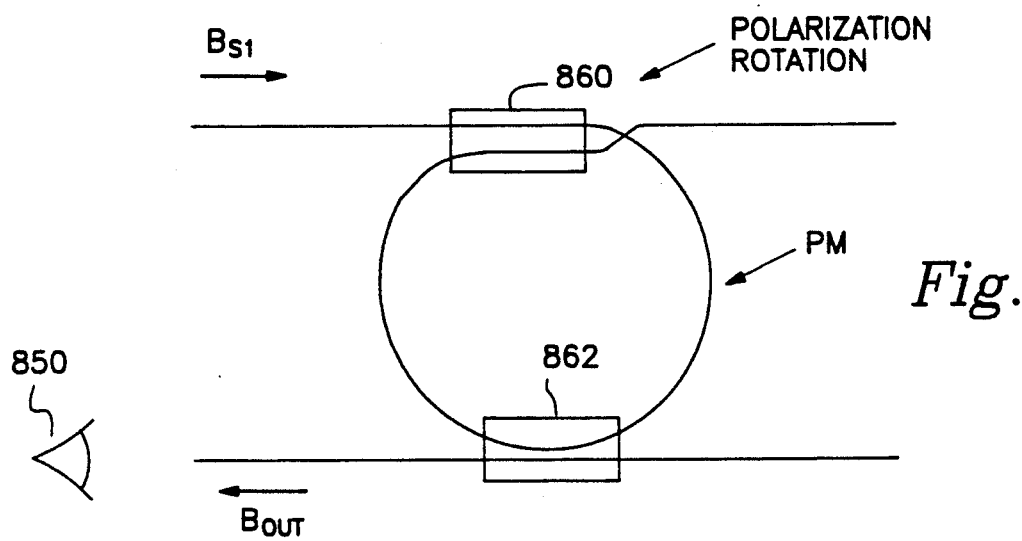
Figure 8C:
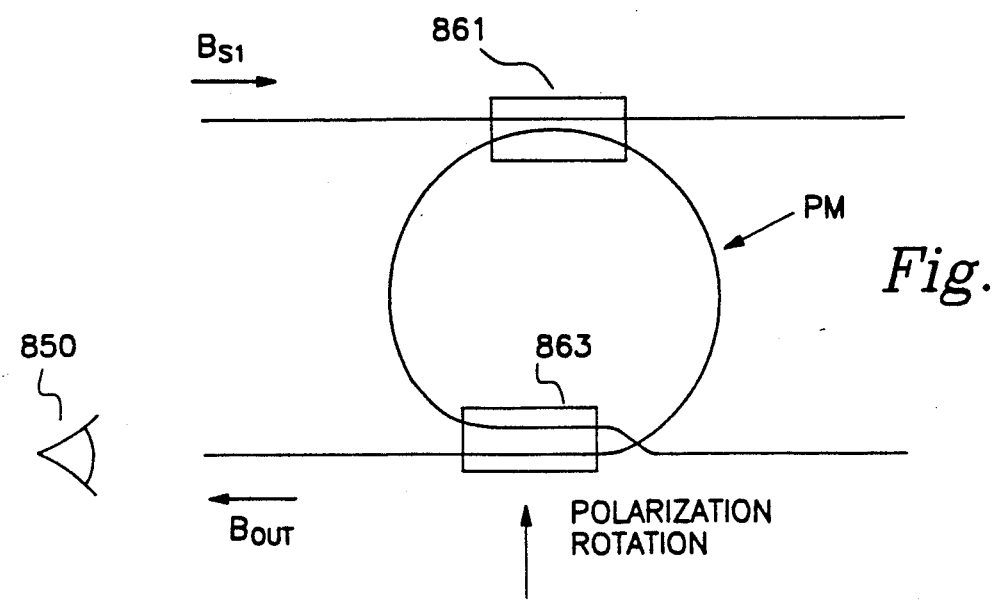

FIGS. 8a–c show still other alternate embodiments employing the principles of the present invention. In FIG. 8a, there are shown two optical couplers 810 and 820. The input beam $B_{S1}$ is injected into optical fiber 815 for coupling into the highly birefringent polarization maintaining fiber 830 which forms the resonant ring 840. Resonant ring 840 also includes a polarization rotation splice 831 like splice 410 of FIGS. 4a and FIG. 5. Optical coupler 820 allows a small portion of the waves traveling about ring resonator 840 to impinge on detector 850. The operation of FIG. 8a differs from that of FIG. 4a in so far as detector 850 will see a peak output when the frequency of the input beam $B_{S1}$ is at resonance. The splice 831 performs, again, the same intended function as the splice 410 in FIG. 4a. That is, for a splice polarization rotation angle substantially equal to 90° the free spectral ranges of the two polarization states are substantially equal and their resonances are separated and don't cross with temperature. Other angles are also of interest for producing separation between different polarization resonances.

FIG. 8b is similar to FIG. 8a with the addition of a spliceless ring resonator formed like that already illustrated in FIG. 7a. Coupler 860 performs the polarization rotation and coupling function the same as coupler 720 in FIG. 7a. Coupler 862 performs the coupling function like coupler 820 in FIG. 8a. Detector 850 detects output signal, $B_{out}$. At resonance, the detector 850 output is a maximum.

FIG. 8c is another alternative embodiment employing the principles illustrated in FIG. 7a and FIGS. 8a–b. In FIG. 8c, coupler 861 serves the same intended function as coupler 810 in FIG. 8a. The ring resonator is formed by an output coupler 863 which forms in part the coupler and spliceless ring resonator in a manner as already described.

Thus, in practice of the present invention, the unwanted polarized waves in the ring resonator, which can deleteriously affect a passive ring resonator gyro, need not be highly suppressed, and in some cases may even be allowed to propagate freely. As previously stated, a 90° polarization rotation angle results in the free spectral ranges for both polarized waves in each direction in the resonator are nearly equal, and therefore track with temperature. Similar beneficial results may be obtained for other selected splice angles.

In the present invention, a passive ring resonator gyro is constructed of an electromagnetic waveguide ring path which incorporates rotation of the polarization of the waves, once for each round trip around the ring path. The polarization rotation of the waves is about the centerline axis of propagation of the waveguide. The polarization rotation in accordance with the present invention may be introduced at any of several possible positions around the ring path, and may be effected in different ways, not limited to those shown in the accompanying drawings.

Although the present invention has been particularly described by way of an optical-fiber ring resonator, any waveguide structure, e.g., metal waveguide, which provide the intended ring resonator having birefringent characteristics is within the scope of the present invention.

The embodiments of an invention in which an exclusive property or right is claimed are defined as follows:

1. A ring resonator gyro comprising:
   a ring resonator including, at least in part, a birefringent waveguide portion having principal axes of birefringence, and in which at some selected point along said birefringent waveguide, said principal axes of birefringence are rotated by a selected angle about the axis of propagation direction of said waveguide;
   first means for producing first and second electromagnetic waves outside said ring resonator; and
   coupling means for
     coupling a first portion of said first electromagnetic wave into said ring resonator to propagate in a first direction along said axis of propagation direction of said waveguide, and
     coupling a first portion of said second electromagnetic wave into said ring resonator to propagate in a second direction along said axis of propagation direction of said waveguide opposite said first direction.

2. The gyro of claim 1 wherein said waveguide is comprised of an optical-fiber.

3. The gyro of claim 2 wherein said optical-fiber is a birefringent optical-fiber and includes a juncture of two optical-fiber ends at which juncture the principal axes of the optical-fiber at said juncture are rotated by a selected angle.

4. The gyro of claim 3 wherein said selected angle is ninety degrees.

5. The gyro of claim 1 further comprising:
   means for providing first and second output signals indicative of the relative energy level of said first portions of said first and second electromagnetic waves, respectively;
   means responsive to said first and second output signals operative to cause said first and second electromagnetic waves to be a frequency substantially equal to the resonant frequencies of said ring resonator in said first and second propagation directions, respectively; and
   means for providing an output signal representative of the frequency difference between said first and second electromagnetic waves at resonance in said ring resonator, and thereby provide an indication of the rotation of said ring resonator.

6. A ring resonator gyro comprising:

a ring resonator including, at least in part, an electromagnetic polarization maintaining waveguide portion having linear birefringent characteristics which define first and second polarization axes perpendicular to the axis of propagation direction of said waveguide;

first means for producing first and second electromagnetic waves outside said ring resonator; coupling means for (i) coupling a first portion of said first electromagnetic wave into said ring resonator to propagate in a first direction along said ring resonator, and in which said coupled first portion of said first electromagnetic wave results in the propagation of first and second polarized waves in said first direction due to, at least in part, said birefringence characteristics of said waveguide portion, and (ii) coupling a first portion of said second electromagnetic wave into said ring resonator to propagate along said ring resonator in a second direction opposite said first direction, and in which said coupled first portion of said first electromagnetic wave results in the propagation of third and fourth polarized waves in said first direction due to, at least in part, said birefringence characteristics of said waveguide portion, and said ring resonator includes means for causing (i) the free spectral range of resonant frequencies of said first polarized waves to be substantially equal to the free spectral range of the resonator frequencies of said second polarized waves, and (ii) each of the resonant frequencies of said second polarized waves to be substantially equally separated from adjacent resonant frequencies of said first polarized waves, (iii) the free spectral range of resonant frequencies of said third polarized waves to be substantially equal to the free spectral range of the resonant frequencies of said fourth polarized waves, and (iv) each of the resonant frequencies of said fourth polarized waves to be substantially equally separated from adjacent resonant frequencies of said third polarized waves.

7. The gyro of claim 6 wherein said waveguide is comprised of an optical-fiber.

8. The gyro of claim 7 wherein said optical-fiber is a birefringent optical-fiber and includes a juncture of two optical-fiber ends at which juncture the principal axes of the optical-fiber at said juncture are rotated by a selected angle.

9. The gyro of claim 8 wherein said selected angle is ninety degrees.

10. The gyro of claim 6 further comprising:

means for providing first and second output signals indicative of the relative energy level of said first portions of said first and second electromagnetic waves, respectively;

means responsive to said first and second output signals operative to cause said first and second electromagnetic waves to be a frequency substantially equal to the resonant frequencies of said ring resonator in said first and second propagation directions, respectively; and means for providing an output signal representative of the frequency difference between said first and second electromagnetic waves at resonance in said ring resonator, and thereby provide an indication of the rotation of said ring resonator.

11. A ring resonator gyro comprising:

a ring resonator including, at least in part, an electromagnetic polarization maintaining waveguide portion having linear birefringent characteristics which define first and second polarization axes along the propagation direction of said waveguide;

first means for producing first and second electromagnetic waves outside said ring resonator; coupling means for coupling a first portion of said first electromagnetic wave into said ring resonator to propagate in a first direction along said ring resonator, and coupling a first portion of said second electromagnetic wave into said ring resonator to propagate along said ring resonator in a second direction opposite said first direction;

second means for spatially rotating, by a selected angle, the direction of linear polarization of said first portions of said first and second electromagnetic waves relative to the axis of propagation of said waveguide for each round trip through said ring resonator.

12. The gyro of claim 11 wherein said first means is capable of producing said first and second electromagnetic waves to have a single linear polarization mode.

13. The gyro of claim 11 wherein said waveguide is comprised of an optical-fiber.

14. The gyro of claim 13 wherein said optical-fiber is a birefringent optical-fiber and includes a juncture of two optical-fiber ends at which juncture the principal axes of the optical-fiber at said juncture are rotated by a selected angle.

15. The gyro of claim 14 wherein said selected angle is ninety degrees.

16. The gyro of claim 11 further comprising:

means for providing first and second output signals indicative of the relative energy level of said first portions of said first and second electromagnetic waves, respectively;

means responsive to said first and second output signals operative to cause said first and second electromagnetic waves to be a frequency substantially equal to the resonant frequencies of said ring resonator in said first and second propagation directions, respectively; and means for providing an output signal representative of the frequency difference between said first and second electromagnetic waves at resonance in said ring resonator, and thereby provide an indication of the rotation of said ring resonator.

17. The gyro of claim 13 wherein:

said electromagnetic waveguide is an optical-fiber having first and second axes of polarization, and said optical-fiber includes a splice which said polarization propagation axes are rotated relative to each other by a selected angle at the juncture of said splice, thereby providing said second means.

18. The gyro of claim 11 further wherein:

said polarization maintaining waveguide is a portion of a single continuous optical-fiber having a loop, and first and second terminating ends; and said coupling means includes first and second segments of said single continuous optical-fiber, said coupling means being constructed such that said first segment is adjacent to a portion of said loop, and in which the orientation of said first and second polarization axes of said first segment and said loop are rotated by a selected angle relative to each other.

19. The gyro of claim 11 further comprising:

coupling means for coupling a portion of said first and second resonator waves out of said ring resonator; and means for detecting the energy of said waves coupled out of said ring resonator.

20. The gyro of claim 11 wherein said coupling means further includes output waveguide mean for permitting the propagation of said first electromagnetic wave portion not coupled into said ring resonator.

21. A ring resonator gyro comprising:

a ring resonator including, at least in part, an electromagnetic polarization maintaining waveguide portion having linear birefringent characteristics which define first and second polarization axes perpendicular to the axis of propagation direction of said waveguide, and in which said birefringent characteristics are defined substantially by first and second indexes of refraction of said waveguide portion;

first means for producing first and second electromagnetic waves outside said ring resonator;

coupling means for (i) coupling a first portion of said first electromagnetic wave into said ring resonator to propagate in a first direction along said ring resonator, and in which said coupled first portion of said first electromagnetic wave results in the propagation of first and second polarized waves in said first direction due to, at least in part, said birefringence characteristics of said waveguide portion, and (ii) coupling a first portion of said second electromagnetic wave into said ring resonator to propagate along said ring resonator in a second direction opposite said first direction, and in which said coupled first portion of said first electromagnetic wave results in the propagation of third and fourth polarized waves in said first direction due to, at least in part, said birefringence characteristics of said waveguide portion; and said ring resonator includes means for causing said first and second polarized waves to exhibit resonant frequencies having substantially equal free spectral range which is substantially a function of an average of said first and second indexes of refraction, and means for causing said third and fourth polarized waves to exhibit resonant frequencies having substantially an equal free spectral range which is substantially a function of an average of said first and second indexes of refraction.

* * * * *